(12) United States Patent
Zettl et al.

(10) Patent No.: US 11,152,666 B2
(45) Date of Patent: Oct. 19, 2021

(54) GLASS-BASED BATTERY SEPARATOR

(71) Applicant: VITRULAN TEXTILE GLASS GMBH, Marktschorgast (DE)

(72) Inventors: Heiko Zettl, Bayreuth (DE); Thorsten Gerdes, Eckersdorf (DE); Ulrich Schadeck, Weiden (DE)

(73) Assignee: Vitrulan Textile Glass GmbH, Marktschorgast (DE)

( * ) Notice: Subject to any disclaimer, the term of this patent is extended or adjusted under 35 U.S.C. 154(b) by 81 days.

(21) Appl. No.: 16/500,046

(22) PCT Filed: Apr. 3, 2018

(86) PCT No.: PCT/EP2018/058434
§ 371 (c)(1),
(2) Date: Oct. 1, 2019

(87) PCT Pub. No.: WO2018/185075
PCT Pub. Date: Oct. 11, 2018

(65) Prior Publication Data
US 2020/0185679 A1 Jun. 11, 2020

(30) Foreign Application Priority Data
Apr. 3, 2017 (DE) ..................... 10 2017 205 653.3

(51) Int. Cl.
H01M 50/44 (2021.01)
H01M 10/0525 (2010.01)
H01M 50/431 (2021.01)
H01M 50/403 (2021.01)
H01M 50/463 (2021.01)

(52) U.S. Cl.
CPC ....... *H01M 50/44* (2021.01); *H01M 10/0525* (2013.01); *H01M 50/403* (2021.01); *H01M 50/431* (2021.01); *H01M 50/463* (2021.01)

(58) Field of Classification Search
None
See application file for complete search history.

(56) References Cited

U.S. PATENT DOCUMENTS

| 2,142,686 | A | * | 1/1939 | Spencer | .................... | C10L 9/10 |
| | | | | | | 44/591 |
| 5,468,572 | A | | 11/1995 | Zguris et al. | | |
| 7,097,939 | B2 | * | 8/2006 | Ferreira | ................ | H01M 10/10 |
| | | | | | | 429/302 |
| 9,159,979 | B2 | | 10/2015 | Weber et al. | | |
| 2007/0292673 | A1 | | 12/2007 | Katagiri et al. | | |
| 2008/0124559 | A1 | | 5/2008 | Fujiwara et al. | | |
| 2008/0248381 | A1 | | 10/2008 | Hennige et al. | | |
| 2011/0081601 | A1 | | 4/2011 | Weber et al. | | |
| 2013/0157109 | A1 | | 6/2013 | Ino et al. | | |
| 2018/0010291 | A1 | | 1/2018 | Zettl et al. | | |

FOREIGN PATENT DOCUMENTS

| DE | 10347566 A1 | 5/2005 |
| DE | 102011003186 A1 | 7/2012 |
| EP | 2 605 311 A1 | 6/2013 |
| JP | 03-289058 | * 12/1991 |
| WO | WO 2009/103537 A1 | 8/2009 |
| WO | WO 2010/149265 A1 | 12/2010 |
| WO | WO 2013/045350 A1 | 4/2013 |
| WO | WO 2014/047126 A1 | 3/2014 |
| WO | WO 2016/210225 A1 | 12/2016 |

OTHER PUBLICATIONS

Machine translation of JP 2002-298816, published on Oct. 11, 2002 (Year: 2002).*
Machine translation of JP 03-289058, published on Dec. 19, 1991 (Year: 1991).*
European Patent Office, International Search Report in International Application No. PCT/EP2018/058434 (dated Oct. 1, 2018).
European Patent Office, Written Opinion in International Application No. PCT/EP2018/058434 (dated Oct. 1, 2018).
International Bureau of WIPO, International Preliminary Report on Patentability in International Application No. PCT/EP2018/058434 (dated Oct. 8, 2019).

* cited by examiner

*Primary Examiner* — Anca Eoff
(74) *Attorney, Agent, or Firm* — Leydig, Voit & Mayer, Ltd.

(57) ABSTRACT

The present invention relates to a battery separator containing a composite that in turn contains the following components: (A) 5 to 95 wt.-% of at least one carrier material that consists of glass fibers, the carrier material being selected from the group comprising nonwovens, laid scrims, knitted fabrics, woven fabrics and/or mixtures thereof; (B) 5 to 95 wt.-% of at least one glass platelet having an average thickness of 0.05 μm to 30 μm; and (C) 0 to 95 wt.-% of at least one binder; the components (A), (B) and (C) adding up to 100 wt.-% and the battery separator having a porosity in the range of 10 to 70% and a total thickness of 0.01 mm to 0.5 mm. The present invention further relates to methods for producing the battery separator and to the use thereof in a battery.

16 Claims, 4 Drawing Sheets

GLASS-BASED BATTERY SEPARATOR

CROSS-REFERENCE TO RELATED APPLICATIONS

This patent application is the U.S. national phase of International Application No. PCT/EP2018/058434, filed on Apr. 3, 2018, which claims the benefit of German Patent Application No. 10 2017 205 653.3, filed Apr. 3, 2017, the disclosures of which are incorporated herein by reference in their entireties for all purposes.

The present invention relates to a battery separator, the latter comprising a composite of at least one carrier material, at least one glass flake and optionally at least one binder. Furthermore, the present invention relates to methods for the production of this battery separator and also use thereof in a battery.

Battery separators are known from the state of the art, frequently polymer-based microporous films or woven fabrics are used as separators for batteries, in particular for lithium-ion batteries. These separators can consist of a plurality of layers of different polymers with different melting points.

WO 2014/047126 A1 describes battery separators which prevent dendrite growth and internal short circuits because of the dendrite growth. These separators have at least one polyethylene layer with a thickness of equal to or less than approx. 6 μm.

DE 10 2011 003 186 A1 relates to a film which has polymer fibres and the polymer fibres of which are welded together between the pores at least at the intersection points, or are connected together in a frictional or form fit, a method for the production thereof, and also the use thereof, in particular as battery separators.

The polymer-based separators are however mechanically stable only up to temperatures of far below 200° C. and already show significant shrinkage from 100° C. so that the function of the physical separation of the electrodes is no longer ensured. In addition, the polymer-based separators display poor wetting relative to the electrolyte liquid.

In addition to the polymer-based separators, also ceramic-based separator materials are described in the state of the art. DE 103 47 566 A1 relates to a separator for an electro-chemical cell which comprises a flexible, perforated carrier with a ceramic coating. This coating comprises 75 to 99 proportions by mass of oxide particles and 1 to 25 proportions by mass of zeolite particles.

For the ceramic-based battery separators, a somewhat higher temperature stability of up to 250° C. is achieved.

Also glass-based battery separators have been described already. WO 2010/149265 A1 relates to a battery separator with a porous, ion-permeable glass sheet, or a porous, ion-permeable glass ceramic sheet, the sheet having an average pore size of less than 1 μm and a thickness of less than 0.3 mm.

U.S. Pat. No. 5,468,572 describes methods for the production of a valve-controlled lead/acid battery which consists of a battery housing and at least one cell, which consists of a separator comprising glass fibres, at least one positive electrode, at least one negative electrode and a quantity of electrolyte contained in the electrodes and in the separator.

WO 2016/210225 A1 relates to special glass mats or separators for batteries. These glass mats can be produced from insoluble glass fibres which are mixed with soluble materials.

WO 2013/045350 A1 describes the use of a material based on glass as additive or filler for a rechargeable lithium-ion accumulator.

US 2013/0157109 A1 relates to a separator comprising glass flakes and fibre materials. The porosity of these glass flakes is between 70 and 95% and the average particle diameter is between 15 and 200 μm.

US 2008/0124559 A1 describes glass flakes which are used in particular in coating materials, ink compositions and cosmetics, but which are also possible for use in battery separators.

Glass-based separators are known as fibre mats which are very thick or as porous glass flakes which are mechanically inflexible. The separators based on glass flakes, however, have a very high porosity or no dimension of the glass flakes is defined at all. In addition, the glass flakes have a glass composition which does not make it possible that ions, in particular sodium, from the glass participate in electrode reactions.

Furthermore, the separators known from the state of the art mostly represent inactive components of the battery cell which in fact contribute to the weight and the size of the cell, however fulfil no electrochemical tasks.

Starting therefrom, the object of the present invention resided in providing battery separators which have a temperature stability of above 500° C., in particular a shrinkage of <2% at 500° C. and improved mechanical stability. Furthermore, it was the object of the present invention that the battery separators ensure optimised wetting with an electrolyte liquid, in particular an organic electrolyte liquid, and that these can be produced simply, in particular they are intended to be able to be manufactured in a roll-to-roll method. Furthermore, it is essential to the invention that the properties of the battery separators can be adjusted according to the field of application. Thus it was the object of the present invention to provide battery separators which ensure high cell performance, in particular by participation of ions from the separator in electrode processes or the ageing thereof is reduced or which are chemically and/or temperature-stable.

This object is achieved by the features of the battery separator described herein, comprising a composite which comprises the following components:
 (A) 5 to 95% by weight of at least one carrier material consisting of glass fibres, the carrier material being selected from the group consisting of nonwovens, layered fabrics, knitted fabrics, woven fabrics and/or mixtures thereof;
 (B) 5 to 95% by weight of at least one glass flake with an average thickness of 0.05 μm to 30 μm;
 (C) 0 to 95% by weight of at least one binder;
components (A), (B) and (C) adding up to 100% by weight, and the battery separator having a porosity in the range of 10 to 70% and a total thickness of 0.01 mm to 0.5 mm.

Advantageous embodiments of the battery separator according to the invention are also described.

Furthermore, the present invention relates also to methods for the production of the separator according to the invention. Corresponding methods according to the invention are also described.

Uses according to the invention of the battery separators in a battery are also described.

Definitions of the Terms

There is understood by "porosity" in the sense of the present invention, the ratio of cavity volume to total volume. It is determined preferably via mercury porosimetry.

There is understood by "contact angle" or also "wetting angle", according to the present invention, the angle which a liquid drop forms on the surface of a solid to this surface. This can be determined by a contact angle measuring device.

According to the present invention, there is understood by "average edge length" of a glass flake (B), a quarter of the sum of all the edges of the rectangle which defines the base of the glass flake.

There is understood by the "thickness" of the glass flake (B), according to the present invention, the length of the edge of the glass flake which is perpendicular to the base. According to the present invention, the "average thickness" of the glass flakes (B) means that 50% by weight of the glass flakes (B) have a "thickness" which is below the indicated value, whereas the remaining 50% by weight have a thickness which is above the indicated value.

Battery Separator

In a preferred embodiment of the present invention, the proportion of the carrier material (A) in the composite is from 30 to 95% by weight and preferably from 50 to 95% by weight.

According to another preferred embodiment of the present invention, the proportion of glass flakes (B) in the composite is 5 to 70% by weight, preferably 5 to 60% by weight and particularly preferably 5 to 50% by weight.

A further preferred embodiment of the present invention provides that the proportion of binder (C) in the composite is 0.01 to 10% by weight and preferably 1 to 5% by weight.

According to another preferred embodiment of the present invention, the composite has the following composition:
(A) 30 to 95% by weight of at least one carrier material consisting of glass fibres selected from the group consisting of nonwovens, layered fabrics, knitted fabrics, woven fabrics and/or mixtures thereof;
(B) 5 to 70% by weight of at least one glass flake with an average thickness of 0.05 μm to 30 μm;
(C) 0.01 to 10% by weight of at least one binder;
components (A), (B) and (C) adding up to 100% by weight.

According to another preferred embodiment of the present invention, the composite has the following composition:
(A) 50 to 95% by weight of at least one carrier material consisting of glass fibres selected from the group consisting of nonwovens, layered fabrics, knitted fabrics, woven fabrics and/or mixtures thereof;
(B) 5 to 60% by weight of at least one glass flake with an average thickness of 0.05 μm to 30 μm;
(C) 0.01 to 5% by weight of at least one binder;
components (A), (B) and (C) adding to 100% by weight.

According to a further preferred embodiment of the present invention, the at least one binder (C) is an organic-polymer-based binder which is selected preferably from the group consisting of polyvinylidene fluoride, modified celluloses, in particular carboxymethylcellulose (CMC), methylhydroxyethylcellulose, hydroxyethylcellulose, methylhydroxypropylcellulose, starch, preferably modified starch, particularly preferably potato starch, particularly preferably cold-water soluble starch, particularly preferably hydroxypropyl starch, acetylated starch, phosphate starch, oxidised starch, alginic acid, guar gum, styrene-butadiene rubber (SBR), polyacrylic acid (PAA), polymethylmethacrylic acid, styrene acrylates, vinyl acetates, in particular ethylene vinyl acetates, polyurethanes, and also copolymers and mixtures hereof.

Another preferred embodiment of the present invention provides that the glass flakes (B) have the following composition:

20 to 85% by weight of $SiO_2$, 20 to 70% by weight of $B_2O_3$, 0 to 16% by weight of $Na_2O$, 0 to 16% by weight of $Li_2O$, 0 to 5% by weight of $Al_2O_3$, 0 to 5% by weight of $ZrO_2$, 0 to 1% by weight of $SnO_2$, 0 to 1% by weight of $TiO_2$, 0 to 1% by weight of $K_2O$, 0 to 1% by weight of $MoO_3$, up to 2% by weight of refining agents, the proportions of the mentioned components adding up to 100% by weight and the proportion of ZnO, MgO, CaO, BaO in the glass flake (B) being less than 15% by weight, relative to the total mass of the glass flake (B), and the proportion of $Fe_2O_3$ and $Sb_2O_3$ being less than 15% by weight, relative to the total mass of the glass flake (B).

According to a further preferred embodiment of the present invention, the glass flakes (B) have 45 to 55% by weight of $SiO_2$, 38 to 45% by weight of $B_2O_3$, 5 to 9% by weight of $Na_2O$, 0 to 2% by weight of $Al_2O_3$ and 0 to 1% by weight of $ZrO_2$, the proportions of the mentioned components adding up to 100% by weight.

Another preferred embodiment of the present invention provides that the glass flakes (B) have 45 to 55% by weight of $SiO_2$, 38 to 45% by weight of $B_2O_3$, 5 to 9% by weight of $Li_2O$, 0 to 2% by weight of $Al_2O_3$ and 0 to 1% by weight of $ZrO_2$, the proportions of the mentioned components adding up to 100% by weight.

According to another preferred embodiment of the present invention, the glass flakes (B) have 75 to 85% by weight of $SiO_2$ and 15 to 25% by weight of $Li_2O$, the proportions of the mentioned components adding up to 100% by weight.

According to another preferred embodiment of the present invention, the glass flakes (B) have
a content of $SiO_2$, relative to the total mass of the glass flake (B), of 40 to 65% by weight; and/or
a content of $B_2O_3$, relative to the total mass of the glass flake (B), of 25% to 40 by weight; and/or
a content of $Na_2O$, relative to the total mass of the glass flake (B), of 3 to 10% by weight; and/or
a content of $Li_2O$, relative to the total mass of the glass flake (B), of 3 to 10% by weight.

The glass flakes (B) can be produced by special manufacturing methods, for example by rotary atomisation of a glass melt. By adapting the process parameters, glass flakes (B) with different thicknesses, in particular in the range for the average thickness of 0.05 to 30 μm, can be produced.

However also commercially available glass flakes (B) can be used, these are for example obtainable from the companies Nippon Sheet Glass Co., Ltd. (JP) and Glassflake Ltd. (UK).

The properties of glasses can be adjusted within specific limits via their composition. Thus glasses are stable to different degrees in organic media, for example an organic electrolyte consisting of ethylene carbonate and dimethyl carbonate as solvent (mixture ratio 1:1) and lithium hexafluorophosphate ($LiPF_6$) as conductive salt (1 mol/l).

The following table shows some types of glass.

| Components | $SiO_2$ | $B_2O_3$ | $Na_2O$ | $Li_2O$ | $Al_2O_3$ | $ZrO_2$ | BaO |
|---|---|---|---|---|---|---|---|
| Type 1 | 49.27 | 41.36 | 7.87 | | 1.00 | 0.5 | |
| Type 2 | 49.27 | 41.36 | | 7.87 | 1.00 | 0.5 | |
| Type 3 | 80.11 | | | 19.89 | | | |
| Type 4* | 70 | 23 | 7 | | | | |
| Type 5** | 55 | 10 | | | 10 | | 25 | the details of the components were effected in percent by weight;
*described in WO 2010/149265 A1;
**described in WO 2009/103537 A1.

Glasses of types 1 and 2 (cf. table) can emit ions by cyclic loading or the glass of the glass flakes acts as ion exchange material. In the case of glass of type 1, release of sodium ions is detectable, which increase the cell performance by the conductivity of the SEI (solid electrolyte interface) being increased by incorporation of these ions. Furthermore, a successive reduction in the battery cell inner resistance can be established with progressive cyclic loading. Glass of type 2 makes it possible to reduce the ageing of a battery cell by releasing lithium.

Glasses of types 1 or 2 concern glass systems of the same type which can be demixed.

Glass of type 3, because of the special glass composition, releases no or only very few ions and should hence be considered to be chemically stable in the electrolyte. The glasses according to types 1 and 2 can likewise be regarded as chemically stable, however they also have an electrochemical function.

Glass types 4 or 5 are described within the scope of other protective rights. Glass type 4, similarly to glasses of types 1 and 2, can be demixed. This glass is however described as porous, which means that the sodium ions are dissolved out. Hence, these are no longer available for ion exchange and for participation in electrode reactions. Glass type 5 has no ions, in particular alkali ions (Li/Na), which would be suitable for intercalation in a graphite anode. Hence, this glass is not suitable for providing ions for participation in electrode reactions and should be regarded as inactive.

According to a further preferred embodiment according to the invention, the carrier material (A) is a glass nonwoven, the latter having glass fibres which are preferably selected from the group consisting of E glass fibres, C glass fibres or glass fibres which have a glass composition as was indicated in the above embodiments for glass flakes (B) and mixtures hereof.

A further preferred embodiment according to the invention provides that the carrier material (A) is a glass-fibre fabric, the latter having endless glass fibres which are preferably selected from the group consisting of E glass fibres, C glass fibres or glass fibres which have a glass composition as was indicated in the above embodiments for the glass flakes (B) and mixtures hereof.

If the material is present as layered fabric, also multiaxial glass-fibre fabrics can be used in addition to unidirectional glass-fibre fabrics.

According to another preferred embodiment of the present invention, the battery separator has high wetting relative to an electrolyte liquid, in particular the contact angle between the electrolyte liquid and the separator is <30°.

A further preferred embodiment of the present invention provides that the battery separator has a porosity in the range of 20 to 60% and preferably 30 to 55%.

According to another preferred embodiment of the present invention, the glass flakes (B) have an average thickness in the range 0.5 to 20 µm and preferably 1 to 10 µm.

Preferably also at least 98% by weight of the glass flakes (B) thereby have an average edge length of <45 µm and particularly preferably <31 µm and at least 99% by weight of the glass flakes (B) have an average edge length of <50 µm and preferably <32 µm.

Another preferred embodiment of the present invention relates to a battery separator which has a thickness in the range of 0.02 to 0.3 mm and preferably 0.05 to 0.2 mm.

According to another preferred embodiment of the present invention, the battery separator has a porosity in the range of 20 to 60% and preferably 30 to 55% and the glass flakes (B) have an average thickness in the range of 0.05 to 20 µm and preferably 1 to 10 µm and the battery separator has a thickness in the range of 0.02 to 0.3 mm and preferably 0.05 to 0.2 mm.

According to a further preferred embodiment of the present invention, the battery separator consists of the composite.

According to another preferred embodiment of the present invention, the composite consists of components (A) to (C).

Another preferred embodiment of the present invention provides that the battery separator consists of the composite and this composite consists of components (A) to (C).

According to another preferred embodiment of the present invention, the glass flakes (B) are integrated in a brick wall structure in the material, preferably in a glass nonwoven. As a result of this special structure, good wetting with the electrolyte is ensured, on the one hand, during use in a battery and permeability for ions from the electrolyte. On the other hand, high stability at high temperatures and, simultaneously, in particular by the use of micrometre glass flakes and glass nonwovens, high mechanical flexibility and stability is ensured.

A further preferred embodiment of the present invention provides that the glass flake (B) has an aspect ratio in the range of 1:3 to 1:100, preferably in the range of 1:5 to 1:20.

According to a further embodiment of the present invention, the shrinkage of the battery separator, if the latter is subjected to a temperature of 500° C. for 60 minutes is less than 2%.

Method for the Production of the Battery Separator

The method according to the invention for the production of a battery separator comprises the following steps:
(a) providing a carrier material (A);
(b) providing glass flakes (B);
(c) introducing the glass flakes (B) into the carrier material (A) via a method selected from the group consisting of film-drawing, air doctoring, roll-doctoring, reverse roll coating, kiss coating, spattering coating, scarf application, template screen printing, flatbed screen printing, curtain coating, spray nozzle application, halftone printing or via calendering, after which a battery separator is obtained;
(d) drying the battery separator from step (c).

The battery separators according to the invention can therefore be manufactured in a simple roll-to-roll method. For drying according to step (d), it is preferred to dry in air. In particular with a high proportion of binder (C), in the composite, vacuum application for the drying must be omitted. Otherwise, the danger of forming cracks arises. For low binder proportions, also vacuum drying technology can however be applied.

A preferred variant of the method according to the invention provides that, firstly on a substrate, in particular a film or a paper, a film of the glass flakes (B) with the binder (C) and the carrier material (A) is applied and dried. This film can be detached again from the substrate during introduction of the battery separator into a battery.

Use

The use according to the invention provides that the battery separator according to the invention is used in a battery comprising at least one electrolyte and at least 2 electrodes.

According to a preferred embodiment of the present invention, sodium- and/or lithium ions are dissolved from the glass flakes (B) in the electrolyte and participate in electrode reactions.

Basically, the battery separators according to the invention can be used in all batteries which use electrolytes against which glass is resistant, preferably however they are lithium-ion batteries.

EXPERIMENTAL PART

Figure 1:
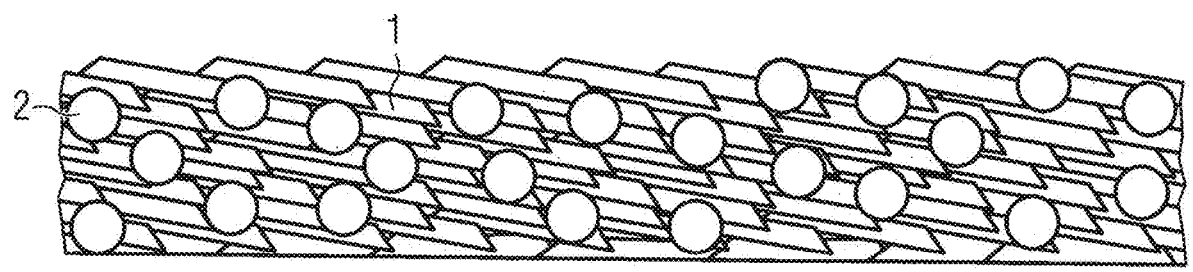
FIG. 1 is the schematic illustration (side view) of micrometre glass flakes (characterised with the reference number 1) which are integrated in glass nonwovens (characterised with the reference number 2) in a brick wall structure.
Figure 2:
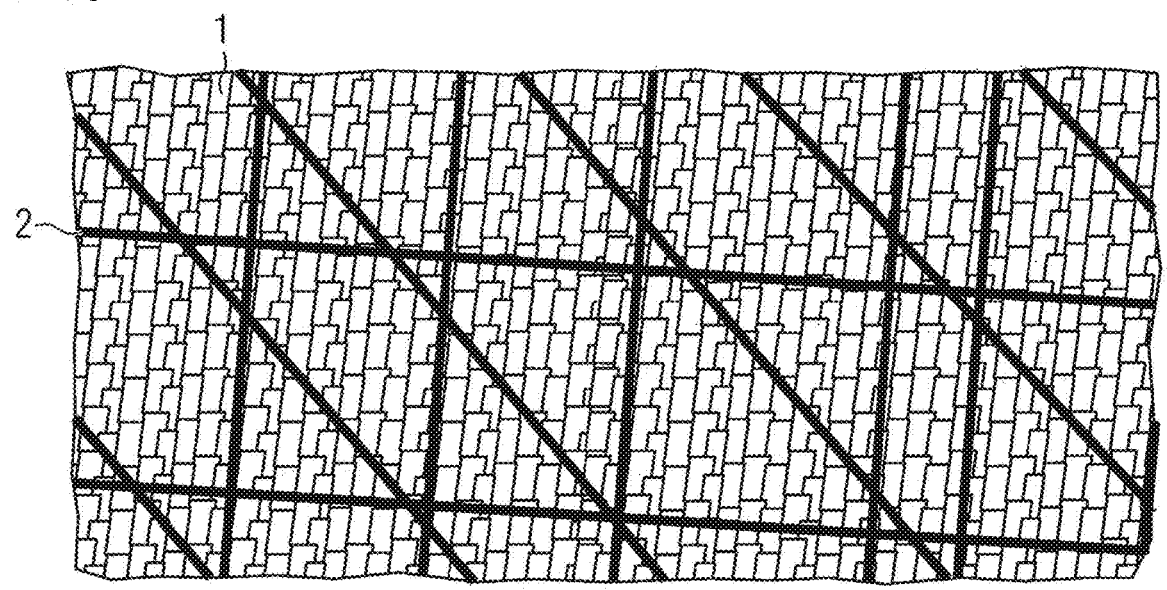
FIG. 2 illustrates the corresponding plan view.

The following embodiment serves to illustrate better the invention, however should not be regarded in any way as restrictive.

For the embodiment, a glass with the following composition was used (corresponds to type 1 from the table in the general description):
$SiO_2$: 49.27% by weight
$B_2O_3$: 41.36% by weight
$Na_2O$: 7.87% by weight
$Al_2O_3$: 1.00% by weight
$ZrO_2$: 0.5% by weight
Determination of the Porosity The porosity of the produced separator was determined via mercury porosimetry on a Micromeritics Autopore III (measuring method: mercury porosimetry, parameters: 0.004 to 393 MPa, contact angle 130°).
Determination of the Average Thickness of the Glass Flakes (B)

In order to determine the thickness of the glass flakes (B), these were embedded in an epoxide resin (EpoFix Resin; Struers A/S). The glass flakes were then measured by means of scanning electron microscope recordings R (Jeol JSM-840A), the indicated value corresponding to the average of 100 measurements.
Glass Flake Production A glass with the above-indicated composition was melted in a glass melt unit at a temperature of 1,350° C., a heating rate of 10° C./min and a holding time of 2 hours at 1,350° C. being chosen. Via a drain, a defined throughput (200-1,000 kg/d) was set for the glass strand flowing into the rotary atomiser. As a result, it is possible to produce glass flakes (glass flakes) of different thicknesses. By rotation of the atomiser unit, preheated to 800° C., with 10,000 rpm, the poured-in glass melt is discharged by centrifugal forces over the edge of the atomiser unit and stretched in the form of a film (lamella) until glass breakage. The final plate-shaped form is achieved by comminution of the glass flake bundle produced by the described process. Thereafter, the glass flakes were classified (sorting out of more than 98% by weight of the plates with an average edge length of 32 μm or greater is effected via a sieve), after which glass flakes, the average thickness of which was 7 μm, were obtained, more than 98% by weight of the glass flakes having an average edge length of <32 μm.
Production of the Suspension The glass flakes produced as described above were mixed with a binder in the weight ratio 50:1. The proportion of binder is thereby indicated on the pure substance without solvent. An already pre-manufactured binder (modified potato starch, cold water-soluble with <0.1% by weight of biocide) with an aqueous solvent in a weight ratio of binder:starch=1:9 was used. The mixture ratio was chosen in order that the processibility via a doctoring method was possible (see production of the separator composite). The components were mixed via a rotary mixer for 2 to 10 minutes with a speed of rotation of 1,000 to 1,500 rotations per minute.
Production of the Glass Nonwoven-Glass Flake Composite The glass flake binder mass produced as described above was integrated into a glass nonwoven (Owens Corning, 35 $g/m^2$ nonwoven) via a doctoring method. The chosen weight ratio of glass flake-binder mass:glass nonwoven was thereby 1:1.

An automatic feed rate of 2.5 mm/s was thereby chosen and the height of the doctor knife was adjusted to the level of the glass nonwoven. Hence a complete integration of the glass flakes in the glass nonwoven was achieved and, at the same time, a surface coating was avoided. After the integration process, the glass-composite separator according to the invention was dried in air.

The obtained battery separator which is composed, up to 49.5% by weight, of glass nonwoven, 49.5% by weight of glass flakes and a percentage of binder, has a porosity of 35.74% and a thickness of 0.243 mm.

It is known to the person skilled in the art that, in order to be able to integrate the described, classified glass flakes in their entirety into a glass nonwoven, dependent upon the viscosity of the glass flake-binder suspension, the processing speed, the average glass flake edge length and -thickness and the nature (size of the fibre intermediate spaces/thickness) of the glass nonwoven respectively, adaptation of the method- and material parameters is required. The example according to the invention specifies a concrete route for implementing the invention.
Electrochemical Measurements Electrochemical measurements were implemented by means of a gas-impermeable measuring cell, constructed from Swagelok parts. The cell construction was effected under an inert gas atmosphere in a glove box. Firstly an electrode and thereafter the battery separator according to the invention were hereby placed in the cell and made wet with electrolyte (1:1 mixture of ethylene carbonate and dimethyl carbonate with 1 mol/l lithium hexafluorophosphate). The cell construction was completed with a corresponding counterelectrode, a metal sheet and a metal spring before the cell was sealed in a gas-impermeable manner.

Figure 3:
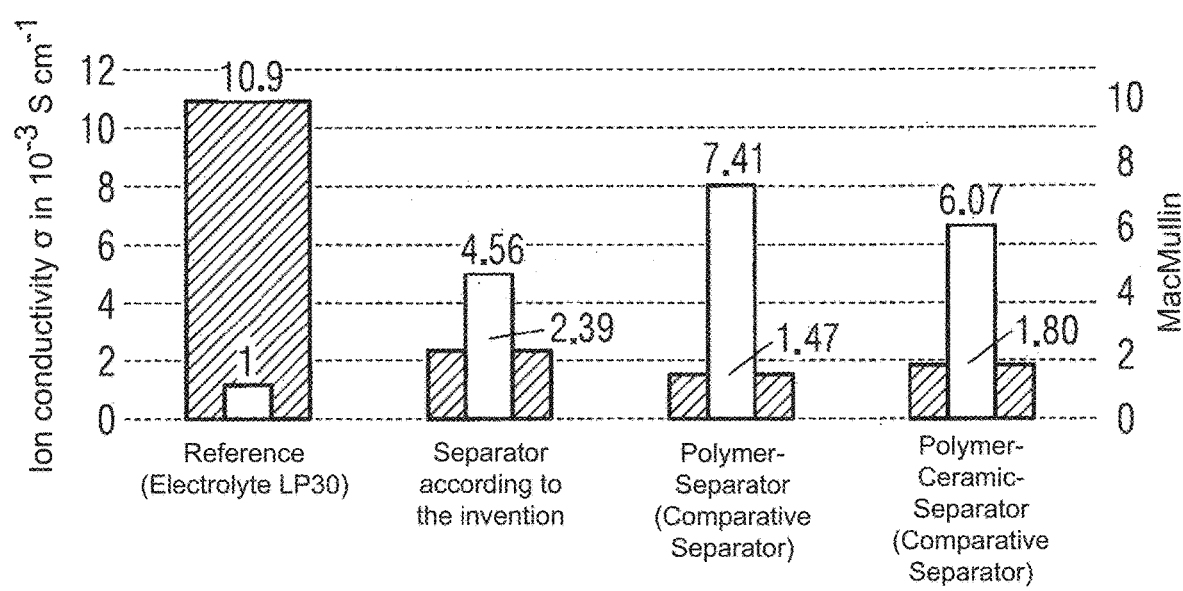
FIG. 3 shows the ion conductivity of the battery separator according to the invention in comparison with a polymer-based separator (b) and a polymer-ceramic-based separator.
Figure 4:
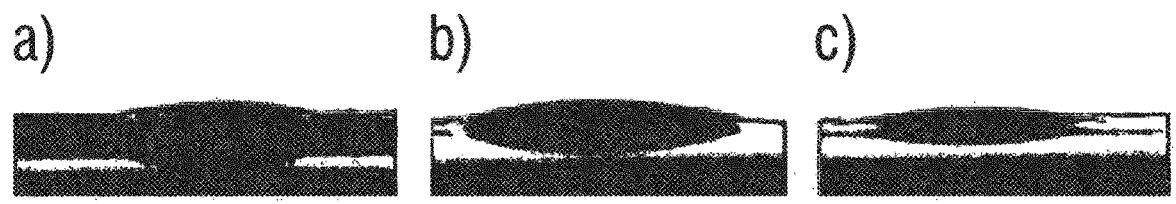
FIG. 4 illustrates the contact angles of the battery separator (a) according to the invention, of a polymer-based separator (b) and of a polymer-ceramic-based separator (c).

Impedance analyses were implemented in the frequency range of 1 mHz to 1 MHz, and also charging and discharging at current rates of 1-10 C with a discharge depth of 0-100%, it emerging that the cells equipped with the above-described, glass-based separators according to the invention display excellent electrochemical properties. The conductivity of for example lithium ions through the separator according to the invention is in general higher by up to 60% than the conductivity through polymer-based separators according to the state of the art (cf. FIG. 3). This is because of the greater pore diameters which were measured in the range of 0.1 to 5 μm and the hence accompanying optimised diffusion of ions through the separator. Furthermore, excellent wetting with electrolytes could be established, because a defined quantity of the electrolyte solvent, dimethyl carbonate, was absorbed instantaneously into the glass nonwoven-glass flake composite (e.g. 10 μl of dimethyl carbonate, complete absorption within 50 ms; sample in 12 mm coin format). In order to be able to quantify the wetting, in addition, contact angle measurements were implemented, in the case of which the dimethyl carbonate occurring in the solvent of the electrolyte used was given to the membranes in a defined quantity. The contact angle was measured 25 ms after the contacting of the drop with the membrane (cf. FIG. 4). This was necessary since the drop, in the case of the battery separator according to the invention, was absorbed in fact completely into the membrane after 50 ms and a measurement of the contact angle was hence no longer possible.

Furthermore, it was able to be established that, after progressive cyclic loading of test cells equipped with the battery separators according to the invention, a reduction in the capacitive resistances occurred. As a result of the specially used glass (type 1 as indicated above) an ion exchange was effected in the electrolyte. During this process, sodium ions were released and these were present as additive in the electrolyte. These ions settled into the formed SEI (solid electrolyte interface) and increased the conductivity thereof for lithium ions. This behaviour could be confirmed by post-mortem tests on test cells which were subjected to cyclic loading tests of at least 250 full cycles with a 1 C rate (100% DOD). A reduction in the sodium content in the glass flakes in the separator and a corresponding proportion of the graphite electrode used could hereby be detected.

Furthermore, a successive reduction in the battery cell inner resistance with a progressive number of cycles could be established.

Figure 5:
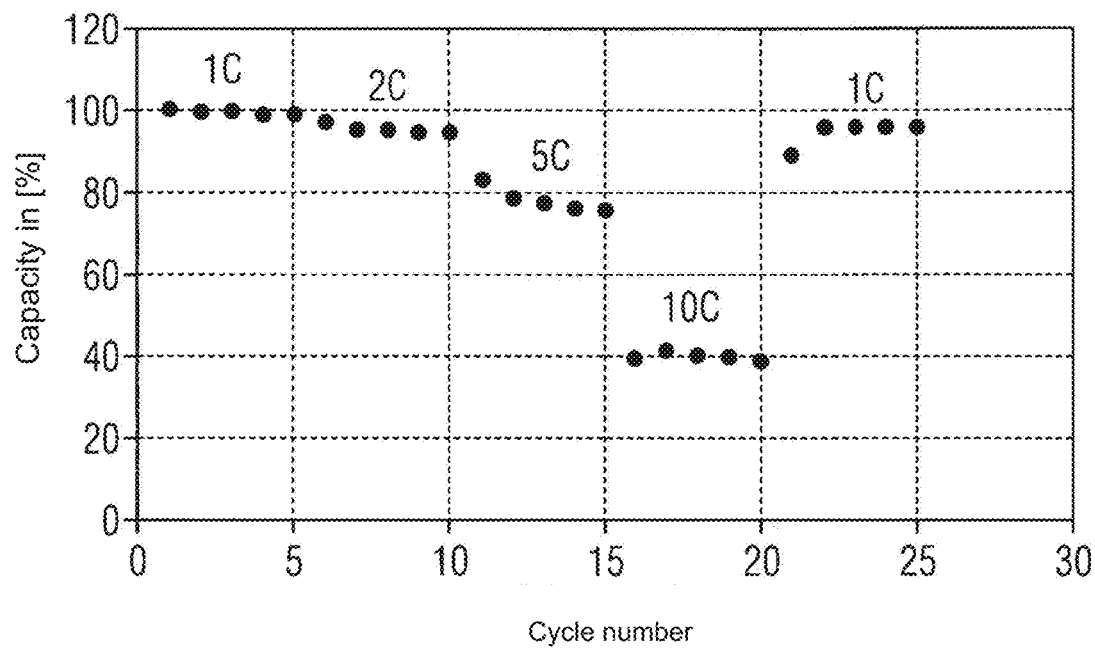
FIG. 5 shows the current strength-dependent loading of a graphite-lithium iron phosphate full cell with a battery separator according to the invention.
Figure 6:
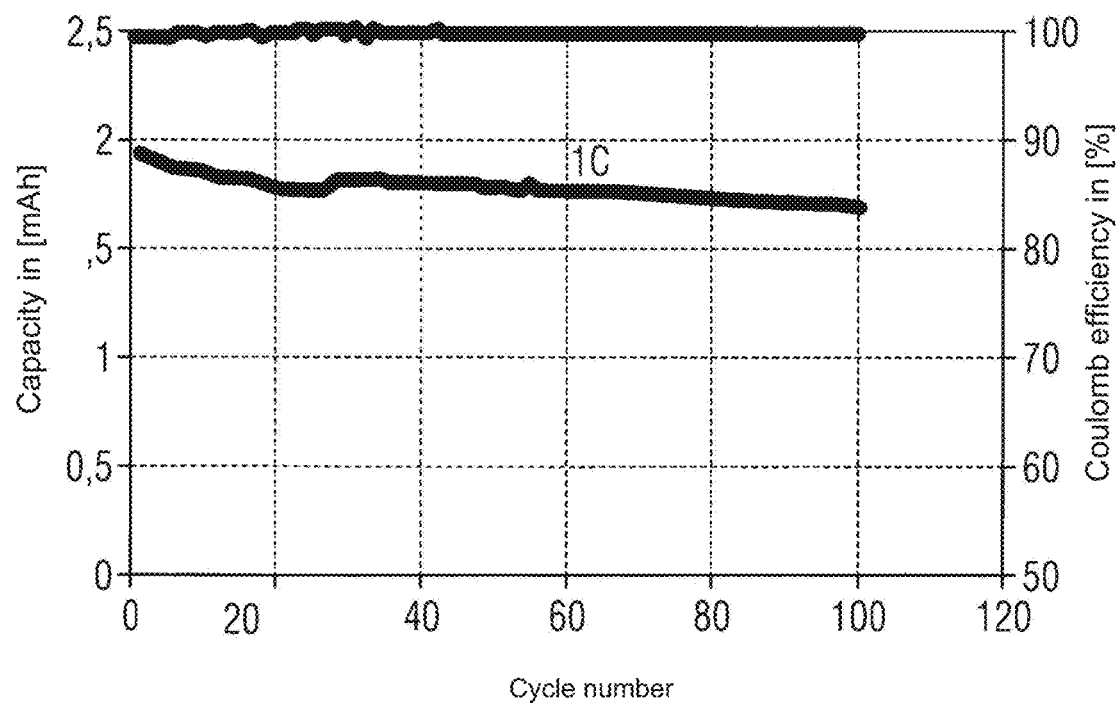
FIG. 6 illustrates the cyclic loading of a graphite-lithium iron phosphate full cell with a battery separator according to the invention over 100 cycles.

In the case of cyclic loading tests of test cells with glass-based separators, it could be established that, on the one hand, high cycle stability could be achieved (Coulomb efficiency >99.9% at 1 C current loading; charging and discharging within an hour; cf. FIG. 6) and, on the other hand, the test cells could also be loaded with far higher currents without the separator hereby representing a limiting factor. Thus, with a current loading of 10 C (complete charging and discharging of the test cell within 6 minutes), still a very good 40% of the nominal capacity could be charged and discharged, the charging and discharging capacity of the active material hereby representing the mainly limiting factor. This shows that the described development can also be used for batteries in rapid charging operation (cf. FIG. 5).

Thermal Stability

Figure 7:
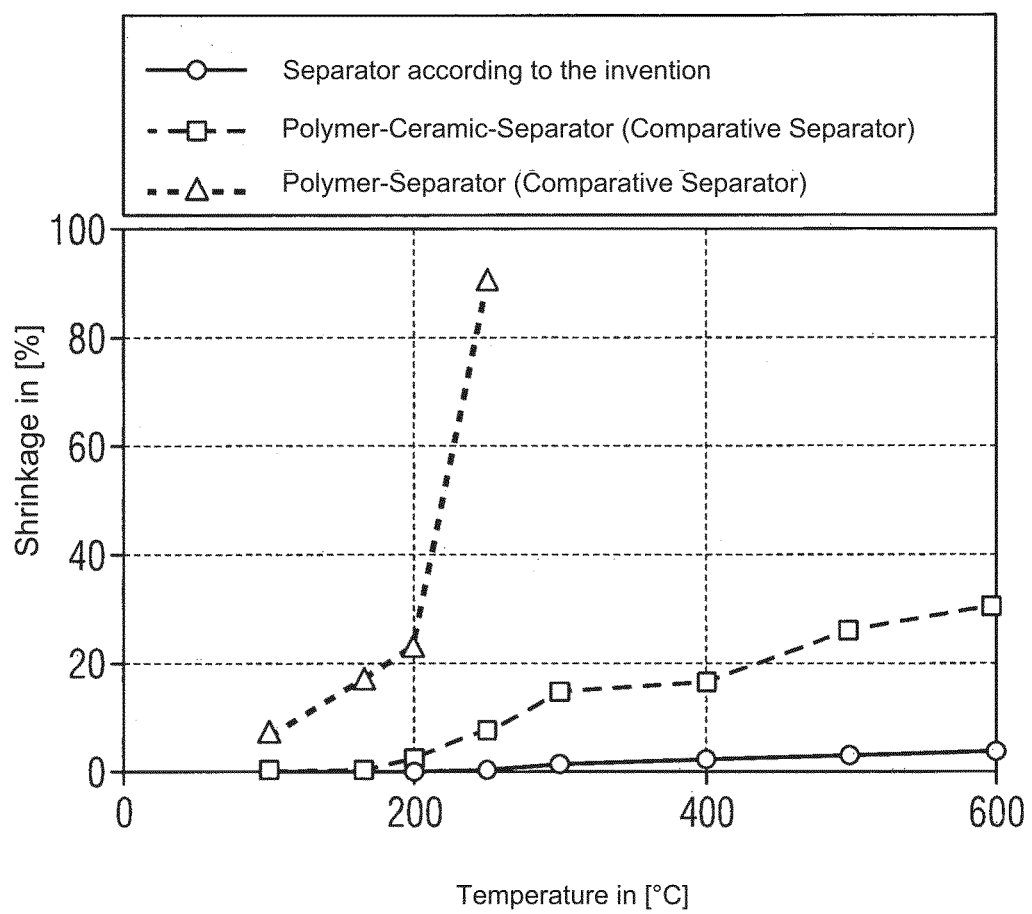
FIG. 7 shows the respective shrinkage under temperature influence of the battery separator according to the invention in comparison with a polymer-based separator and a polymer-ceramic-based separator.

In order to test the thermal stability, the battery separators according to the invention (dimensions of the sample: 30×30 mm) were heated at a heating rate of 5° C./minute with a retaining time of respectively 60 minutes to 600° C. (hot oven test). No significant shrinkage (<2% at 500° C.) could thereby be established. In addition, the mechanical integrity was maintained for the large part by the glass nonwoven, polymer-based separators here melting after at the latest 250° C. (see FIG. 7). Furthermore, the described separator according to the invention, in the so-called hot punch test, could not be pierced with a hot mandrel (2 mm diameter, 200° C.) with a pressure of up to 1.5 kg/mm². Polymer-based separators according to the state of the art hereby melt.

The invention claimed is:

1. A battery separator comprising a composite, comprising the following components:
   (A) 5 to 95% by weight of at least one carrier material consisting of glass fibres, the carrier material being selected from the group consisting of nonwovens, layered fabrics, knitted fabrics, woven fabrics and/or mixtures thereof;
   (B) 5 to 95% by weight of at least one glass flake with an average thickness of 0.05 μm to 30 μm;
   (C) 0 to 95% by weight of at least one binder;
   components (A), (B) and (C) adding up to 100% by weight, and
   the battery separator having a porosity in the range of 10 to 70% and a total thickness of 0.01 mm to 0.5 mm;
   wherein the at least one glass flake (B) has the following composition:
   20 to 85% by weight of $SiO_2$, 20 to 70% by weight of $B_2O_3$, 0 to 16% by weight of $Na_2O$, 0 to 16% by weight of $Li_2O$, 0 to 5% by weight of $Al_2O_3$, 0 to 5% by weight of $ZrO_2$, 0 to 1% by weight of $SnO_2$, 0 to 1% by weight of $TiO_2$, 0 to 1% by weight of $K_2O$, 0 to 1% by weight of $MoO_3$, up to 2% by weight of refining agents, the proportions of the mentioned components adding up to 100% by weight and the proportion of ZnO, MgO, CaO, and BaO in the glass flake (B) is less than 15% by weight, relative to the total mass of the glass flake (B), and the proportion of $Fe_2O_3$ and $Sb_2O_3$ is less than 15% by weight, relative to the total mass of the glass flake (B).

2. The battery separator according to claim 1, wherein the proportion of the carrier material (A) in the composite is 30 to 95% by weight; and/or
   the proportion of glass flakes (B) in the composite is 5 to 70% by weight; and/or
   the proportion of binder (C) in the composite is 0.01 to 10% by weight.

3. The battery separator according to claim 1, wherein the at least one binder (C) is an organic-polymer-based binder.

4. The battery separator according to claim 3, wherein the organic-polymer-based binder is selected from the group consisting of polyvinylidene fluoride, carboxymethylcellulose (CMC), methylhydroxyethylcellulose, hydroxyethylcellulose, methylhydroxypropylcellulose, starch, modified starch, cold-water soluble starch, potato starch, hydroxypropyl starch, acetylated starch, phosphate starch, oxidised starch, alginic acid, guar gum, styrene-butadiene rubber (SBR), polyacrylic acid (PAA), polymethylmethacrylic acid, styrene acrylates, vinyl acetates, polyurethanes, and copolymers and mixtures thereof.

5. The battery separator according to claim 1, wherein the glass flakes (B) have 45 to 55% by weight of $SiO_2$, 38 to 45% by weight of $B_2O_3$, 5 to 9% by weight of $Na_2O$, 0 to 2% by weight of $Al_2O_3$ and 0 to 1% by weight of $ZrO_2$, the proportions of the mentioned components adding up to 100% by weight, or
   the glass flakes (B) have 45 to 55% by weight of $SiO_2$, 38 to 45% by weight of $B_2O_3$, 5 to 9% by weight of $Li_2O$, 0 to 2% by weight of $Al_2O_3$ and 0 to 1% by weight of $ZrO_2$, the proportions of the mentioned components adding up to 100% by weight.

6. The battery separator according to claim 1, wherein the glass flakes (B) have
   a content of $SiO_2$, relative to the total mass of the glass flake (B), of 40 to 65% by weight; and/or a content of $B_2O_3$, relative to the total mass of the glass flake (B), of 25% to 40 by weight; and/or a content of $Na_2O$, relative to the total mass of the glass flake (B), of 3 to 10% by weight; and/or a content of $Li_2O$, relative to the total mass of the glass flake (B), of 3 to 10% by weight.

7. The battery separator according to claim 1, wherein the carrier material (A) is a glass nonwoven, the latter having glass fibres selected from the group consisting of E glass fibres, C glass fibres or glass fibres which have a glass composition of 20 to 85% by weight of $SiO_2$, 20 to 70% by weight of $B_2O_3$, 0 to 16% by weight of $Na_2O$, 0 to 16% by weight of $Li_2O$, 0 to 5% by weight of $Al_2O_3$, 0 to 5% by weight of $ZrO_2$, 0 to 1% by weight of $SnO_2$, 0 to 1% by weight of $TiO_2$, 0 to 1% by weight of $K_2O$, 0 to 1% by weight of $MoO_3$, up to 2% by weight of refining agents, the proportions of the mentioned components adding up to 100% by weight, and mixtures thereof.

8. The battery separator according to claim 1, wherein the carrier material (A) is a glass-fibre fabric, the latter having endless glass fibres selected from the group consisting of E glass fibres, C glass fibres or glass fibres which have a glass composition of 20 to 85% by weight of $SiO_2$, 20 to 70% by weight of $B_2O_3$, 0 to 16% by weight of $Na_2O$, 0 to 16% by weight of $Li_2O$, 0 to 5% by weight of $Al_2O_3$, 0 to 5% by weight of $ZrO_2$, 0 to 1% by weight of $SnO_2$, 0 to 1% by weight of $TiO_2$, 0 to 1% by weight of $K_2O$, 0 to 1% by weight of $MoO_3$, up to 2% by weight of refining agents, the proportions of the mentioned components adding up to 100% by weight, and mixtures thereof.

9. The battery separator according to claim 1, which has high wetting relative to an electrolyte liquid, wherein the contact angle between the electrolyte liquid and the separator is <30°.

10. The battery separator according to claim 1, which has a porosity in the range of 20 to 60%; and/or the glass flakes (B) have an average thickness in the range 0.5 to 20 μm; and/or at least 98% by weight of the glass flakes (B) have an average edge length of <45 μm; and/or at least 99% by weight of the glass flakes (B) have an average edge length of <50 μm; and/or the battery separator has a thickness in the range of 0.02 to 0.3 mm.

11. The battery separator according to claim 1, wherein the battery separator consists of the composite; and/or the composite consists of components (A) to (C).

12. The battery separator according to claim 1, wherein the glass flakes (B) are integrated in a brick wall structure in the material.

13. The battery separator according to claim 1, wherein the glass flakes (B) have an aspect ratio in the range of 1:3 to 1:100.

14. The battery separator according to claim 1, wherein the shrinkage of the battery separator, if the latter is subjected to a temperature of 500° C. for 60 minutes, is less than 2%.

15. A method for the production of a battery separator according to claim 1, the method comprising the following steps:

(a) providing a carrier material (A);

(b) providing glass flakes (B);

(c) introducing the glass flakes (B) into the carrier material (A) via a method selected from the group consisting of film-drawing, air doctoring, roll-doctoring, reverse roll coating, kiss coating, spattering coating, scarf application, template screen printing, flatbed screen printing, curtain coating, spray nozzle application, half-tone printing or via calendering, after which a battery separator is obtained; and (d) drying the battery separator from step (c).

16. A battery comprising a battery separator according to claim 1, at least one electrolyte, and at least 2 electrodes.

* * * * *